(No Model.) 2 Sheets—Sheet 1.

F. W. KIMBALL & T. APPLETON.
TRACK BOLTING MACHINE.

No. 370,147. Patented Sept. 20, 1887.

Witnesses
J. B. Dover
A. L. Bennett

Inventors
Francis W. Kimball
Thomas Appleton
by Albert K. Mansfield
Atty.

N. PETERS, Photo-Lithographer, Washington, D. C.

(No Model.) 2 Sheets—Sheet 2.

F. W. KIMBALL & T. APPLETON.
TRACK BOLTING MACHINE.

No. 370,147. Patented Sept. 20, 1887.

Witnesses:
Sam'l B. Dover.
Allan L. Bennett.

Inventors
Francis W. Kimball
Thomas Appleton
by Albert K. Mansfield Atty

UNITED STATES PATENT OFFICE.

FRANCIS W. KIMBALL AND THOMAS APPLETON, OF MILWAUKEE, WISCONSIN.

TRACK-BOLTING MACHINE.

SPECIFICATION forming part of Letters Patent No. 370,147, dated September 20, 1887.

Application filed February 28, 1887. Serial No. 229,081. (No model.)

*To all whom it may concern:*

Be it known that we, FRANCIS W. KIMBALL and THOMAS APPLETON, both residing at Milwaukee, in the county of Milwaukee and State of Wisconsin, have invented a new and useful Machine for Bolting Tracks, of which the following is a specification.

Our invention relates to a method of setting up the nuts of fish-plates or splice-bars on railroad-tracks by machinery; and the object of our invention is to enable this work to be done quicker and cheaper than by previous methods. We attain this object by the mechanism illustrated in the accompanying drawings, in which—

Figure 1:
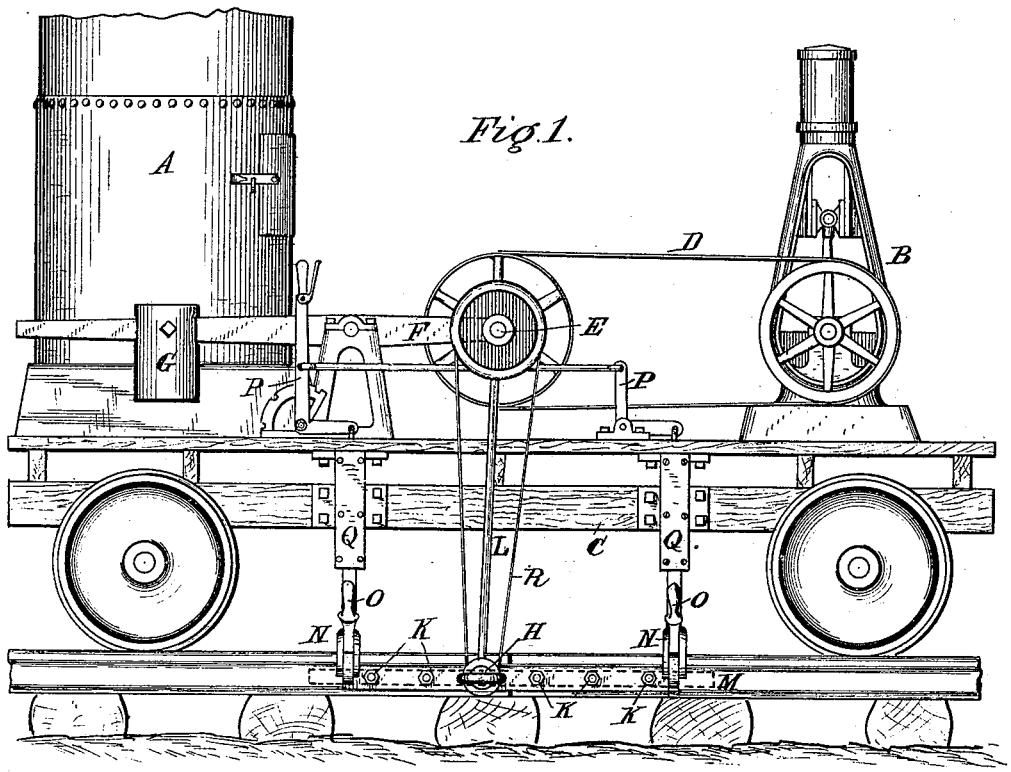
Figure 2:
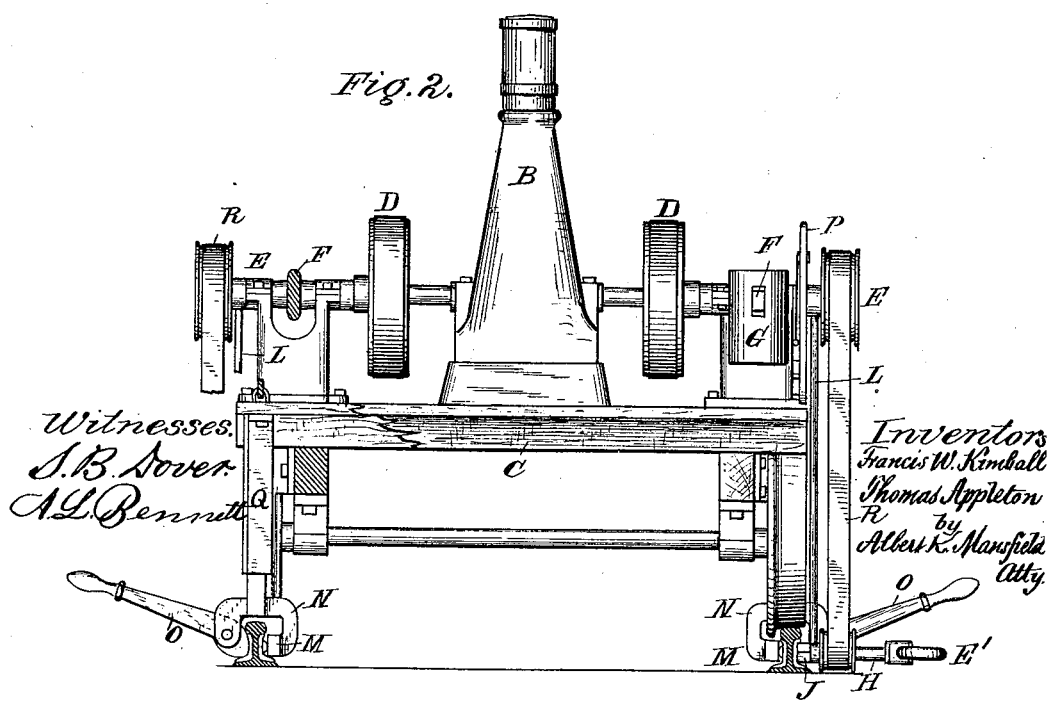
Figure 3:
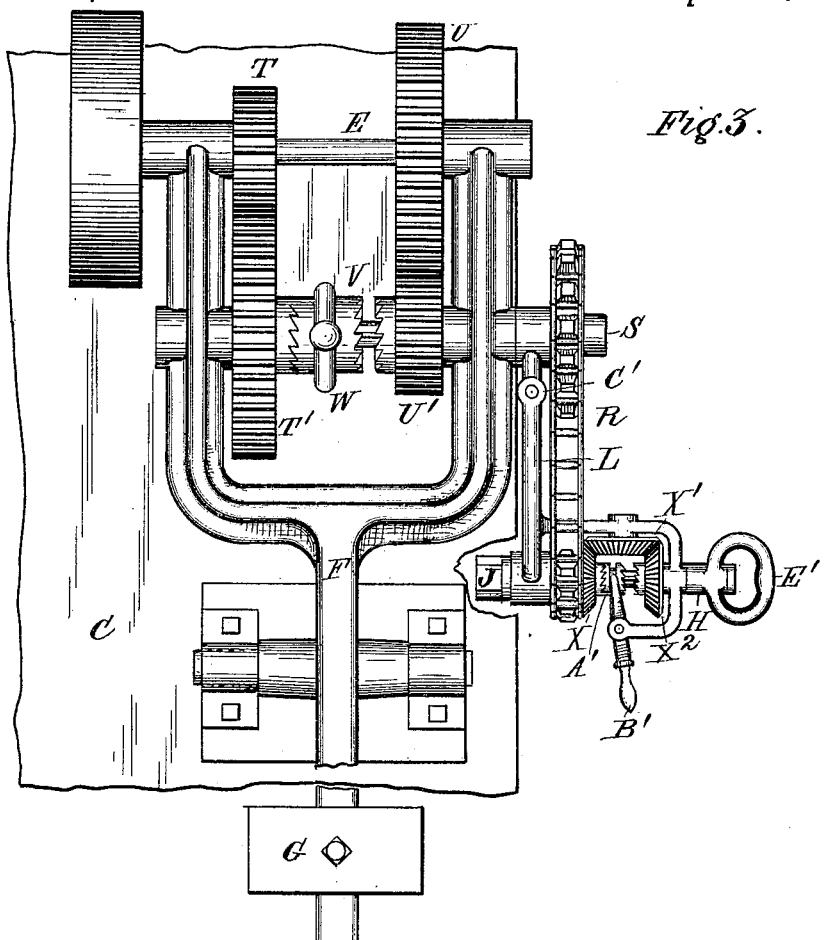
Figure 4:
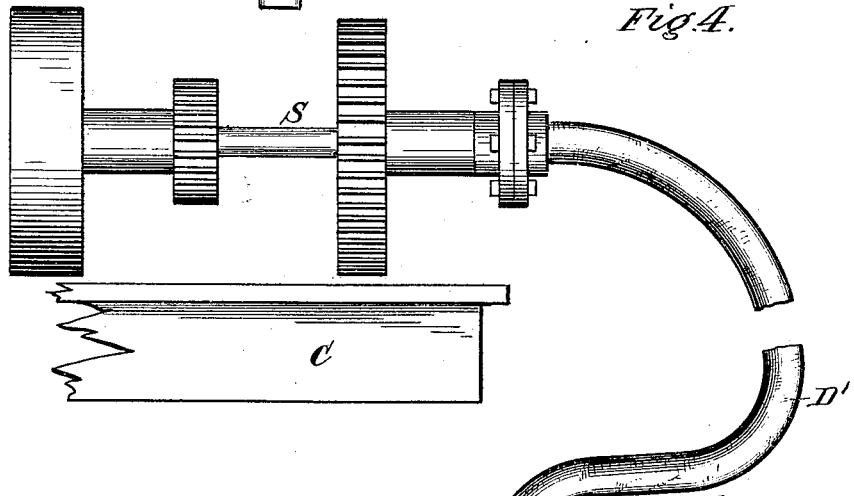

Figure 1 is a side elevation of the machine. Fig. 2 is a sectional end elevation of the same. Fig. 3 is a plan showing an arrangement of gearing which we apply when a reverse motion and change of speed are required. Fig. 4 shows an alternative construction.

A represents a boiler for the generation of steam; B, an engine; C, the car-supporting engine, boiler, and machinery; D D, belts for transmitting power from the engine to intermediate shafts, E E; F F, lever-supports for said intermediate shafts; G G, counterbalance-weights; H H, wrench-shafts carrying socket-wrenches J J, which are shaped to fit over the nuts K K K.

L L are rods or braces interposed between bearings of shafts E and H, to hold them apart the proper distance.

M M are bars held by the yokes N N and designed to bear against the heads of the nuts K K K.

O O are eccentric levers pivoted to the yokes N N. P P are bell-cranks to lift said yokes clear of the track.

Q Q are guides for the connecting-rods between bell-cranks and yokes N N.

R R are belts transmitting power to the wrench-shafts H H.

S, Fig. 3, is a second intermediate shaft receiving motion from the shaft E, through the gears T T' or U U'.

V is a clutch feather-keyed to the shaft S and operated by the hand-lever W. This clutch may engage with clutch-faces on either gear, T' or U', or stand free from both.

X X' X² are bevel-gears to make a reverse motion for the shaft H. A clutch, A', operated by the hand-lever B', is feather-keyed to the shaft H, and the gears X X² have clutch-faces, which may engage with said clutch. A joint, C', is made in the rods L, to permit the wrenches J and their shafts to be moved away from or toward the nuts or bolts K.

D', Fig. 4, is a flexible shaft running from the shaft S and carrying the wrench J at its free end.

The operation is as follows: The car C is moved over or nearly over the joint of a rail. Previous to this the splice-bars have been put in place, the bolts inserted into their holes, and the nuts started on by hand. The yokes N are now dropped by means of the hand-lever P until the bars M are behind the bolt-heads. The levers O are then forced hard down, pinching the splice-bars toward each other and forcing the bolts into place and holding them from turning. This last follows from the fact that such bolts are oval or square directly under the head, and the holes in the inside splice-bar are of corresponding shape. Supposing the engine to be in motion, the clutch V is now thrown into engagement with the gear U', and the clutch A' with either the gear X or X², whichever will impart right-hand motion to the shaft H. The socket J is then guided over one of the nuts K by means of the handle E', and there held until the nut is turned home, or nearly so. To force the nut more firmly to its place, the clutch V may be thrown over into engagement with the gear T', which, having a slower motion, will impart greater "purchase" to the wrench. Having forced the nut home, the clutch V is thrown to its middle position, stopping the motion of the wrench, which is then removed from the nut and the same operation repeated with the other nuts of the splice. If it is desired to withdraw one of the nuts, it can be done by reversing the motion of the wrench by means of the lever B'.

In Fig. 2 an ordinary strap-belt is shown driving the wrench-shaft. In Fig. 3 a link-belt is shown. It is not essential that either of these devices be used, for a flexible shaft, as shown in Fig. 4, may be substituted.

The boiler A may be omitted from the car C, if desired, and the engine B may be driven by compressed air, steam, or other medium, through a flexible conveyer from a supply on some other car remote from the car C. A ratchet movement may be substituted for the continuous movement of the wrench-shaft H, if preferred.

What we claim as our invention is—

1. The combination of the revolving wrench J, flexibly connected to the car C, with the driving engine or motor B, and their connecting parts, substantially as and for the purpose set forth.

2. The combination of engine B, supported by car C, and operating-wrench J, with bar M and yoke N, and their connecting and supporting parts, substantially as set forth.

3. In a machine for bolting track, the change-gears T, T', U, and U', in combination with the reversible revolving wrench J, driven by the engine B, and their connecting parts, substantially as described.

4. In a track-bolting machine, the combination of car C, carrying motor B, with revolving wrench J, means for clamping the splice-bars to prevent turning of bolts, and means for raising the clamping device clear of the track, with connecting parts, substantially as and for the purpose set forth.

FRANCIS W. KIMBALL.
THOS. APPLETON.

Witnesses:
C. R. JACKWITZ,
F. J. DE NEVIN.